(12) United States Patent
Fullerton et al.

(10) Patent No.: US 6,481,037 B1
(45) Date of Patent: Nov. 19, 2002

(54) ARTICULATED RAMP ASSEMBLY

(75) Inventors: Kevin John Fullerton, Wynnum (AU); Theodor Reinhardt Schacht, Wavell Heights (AU)

(73) Assignee: Trans-Ramp Pty Ltd, Paddington (AU)

( * ) Notice: Subject to any disclaimer, the term of this patent is extended or adjusted under 35 U.S.C. 154(b) by 0 days.

(21) Appl. No.: 09/673,097

(22) PCT Filed: Apr. 14, 1999

(86) PCT No.: PCT/AU99/00282

§ 371 (c)(1),
(2), (4) Date: Oct. 12, 2000

(87) PCT Pub. No.: WO99/52738

PCT Pub. Date: Oct. 21, 1999

(30) Foreign Application Priority Data

Apr. 14, 1998 (AU) .............................................. PP 2958

(51) Int. Cl.[7] .............................. B60P 1/43; A61G 3/06
(52) U.S. Cl. ......................... 14/71.1; 414/921; 414/546
(58) Field of Search ........................ 14/69.5, 70, 71.1, 14/71.3; 105/436; 119/847, 849; 414/546, 921

(56) References Cited

U.S. PATENT DOCUMENTS

| 531,860 A | * | 1/1895 | Rhodes ........................ 14/69.5 |
| RE30,250 E | * | 4/1980 | Catlett ......................... 14/71.3 |
| 5,636,399 A | | 6/1997 | Tremblay et al. |
| 5,832,555 A | | 11/1998 | Saucier et al. |
| 6,263,942 B1 | * | 7/2001 | Miller ......................... 160/23.1 |
| 6,292,968 B1 | * | 9/2001 | McLain ....................... 14/71.1 |

FOREIGN PATENT DOCUMENTS

| AU | 39204/85 | 9/1986 |
| DE | 38 12 564 A1 | 11/1989 |
| WO | WO 96/26848 | 9/1996 |

* cited by examiner

*Primary Examiner*—Thomas B. Will
*Assistant Examiner*—Alexandra K. Pechhold
(74) *Attorney, Agent, or Firm*—Young & Thompson

(57) ABSTRACT

An articulated ramp assembly is mounted in housing (22) fixed beneath floor (108) and aligned with a door opening of vehicle (100). Ramp body (12) is articulated along its length and movable along a predetermined trajectory path between an extended position and a retracted position by drive arrangement (20). In the extended position, ramp body (12) extends from floor (108) to ground (106), and in the retracted position, ramp body (12) is contained within housing (22). Drive arrangement (20) includes a reversible motor coupled to an endless chain drive (24) having sprockets (26–44) for moving ramp body (12) along a guide (48) to follow the trajectory path.

24 Claims, 4 Drawing Sheets

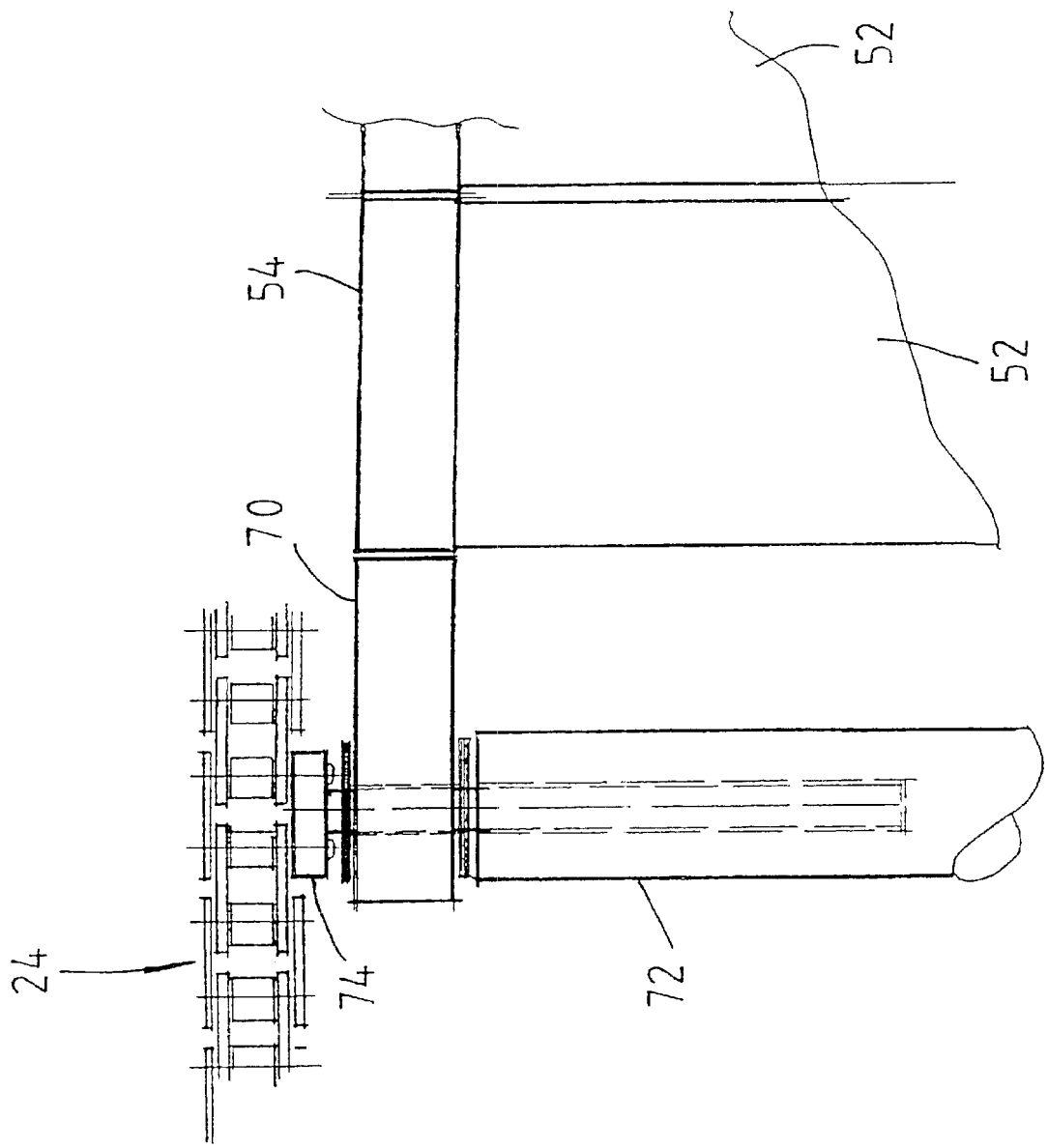

ARTICULATED RAMP ASSEMBLY

FIELD OF INVENTION

THIS INVENTION relates to a ramp assembly arranged for providing access between a vehicle and ground or a platform. In particular but not limited the ramp assembly is arranged for a railway car having a door opening and a floor and is self adjusting for varying heights between the floor and the ground or platform.

BACKGROUND OF THE INVENTION

The applicant has noted that there is often a considerable high step between the floor of a vehicle and the ground or platform. Passengers must therefore step up when entering the vehicle and step down when leaving the vehicle. Many people have difficulties in stepping into or out of vehicles. In particular the aged, young children, most disabled persons and all people in wheelchairs cannot enter or leave vehicles without assistance from other people.

Certain public transport authorities have movable ramps in an effort to allow wheelchaired persons to use public transport without assistance. These ramps are usually kept at stations where the public transport vehicles stop for picking up new passengers and for dropping passengers at destinations. The applicant has also noted other authorities employ movable elevators instead of ramps.

In use, each of the ramps or elevators is manually moved to a door opening of a vehicle for use by the people in wheelchairs. After use, they are moved back to storage and are often locked for security reason. The relevant authorities employ people to physically move them in position for use by the people in wheelchairs and move them back to storage after use.

Moving the ramps or elevators to positions takes time and it sometimes prevents a vehicle from leaving on time. Using them can therefore disrupt time tables of the public transport. This is undesirable especially during peak hours when there is little opportunity to make up time.

The heights between the floors of vehicles and the ground or platforms vary considerably. It is not aware that any attempt has been made to assist people with difficulties stepping into or out of a vehicle to use the vehicles without assistance.

OBJECT OF INVENTION

It is therefore an object of the present invention to alleviate or to at least reduce to a certain level one or more of the above mentioned disadvantages.

SUMMARY OF THE INVENTION

In one aspect therefor the present invention resides in a ramp assembly for a vehicle having a door opening and a floor. The assembly comprises a housing member for fixing to the vehicle at or beneath the floor and substantially in line with the door opening, an extendible ramp body controllably positionable between an extended position and a retracted position, and a drive arrangement for controllably driving the ramp body between the extended position and the retracted position. In the extended position the ramp body extends inclinedly from or adjacent to the floor to the ground or platform. In the retracted position the ramp body is positioned within the housing member.

The housing member may be fixed to the vehicle so that it is substantially parallel with, inclined to or perpendicular to the floor.

It is preferred that the ramp body has articulated means along its length so that it can move in a predetermined trajectory path between the retracted position and the extended position.

More preferably, the articulated means includes a pair of spaced beams arranged in the direction of travel of the body and a plurality of slats arranged between the beams.

Desirably, each of the beams has a plurality of links and adjacent links are pivotally joined together for providing said articulation in the ramp body.

The links are conveniently shaped so that adjacent links have a desired angle of articulation and a desired camber in the beams.

Typically, opposing faces of adjacent links have mating linkage parts which are pivotally joined together for providing articulation to said ramp body. The linkage parts may be recessed so that all links are in the same plane. Each of the linkage parts may also have an outer substantially curve-shaped edge surface and an inner substantially curve-shaped edge surface for matingly co-operating with the outer-surface of an adjacent link.

The mating linkage parts can also have co-operating articulation limiting means for limiting the angle of articulation. The articulation limiting means are conveniently shaped articulation limiting edge surfaces on the mating linkage parts so that they are in abuttal relationship when said adjacent links are of a desired maximum angle of articulation.

The positions of the opposing edges remote from the articulation limiting means are shaped to provide cooperating camber angle limiting parts. Typically the camber angle limiting parts are straight surfaces on said portions of the opposing edges and the distance between the surfaces of each link is selectively determined for the desired camber angle.

The drive arrangement may include a controllable reversible or reciprocable drive means for reversibly or reciprocally driving the ramp body between the retractable position and the extended position, a plurality of guide means for guiding the ramp body to move along the trajectory path and an endless drive band which is connected to the ramp body for moving therewith. Preferably the drive means has a support arrangement for supporting the ramp body at said extended position. Where the drive band is a chain, the drive means desirably includes a drive sprocket which is coupled to the drive shaft of a reversible motor drive or a linear to rotary converter driven by a pneumatic or hydraulic ram, a lower control sprocket, an upper control sprocket which is also arranged for supporting the ramp body at the extended position, a plurality of guide sprockets for guiding the chain and a plurality of trajectory control sprockets for determining the trajectory path of the ramp body.

A tensioning sprocket may also be provided for adjusting the tension on the chain.

Where the endless drive band is in the form of a belt the sprockets may be replaced with pulleys.

Where the clearance below the floor is limited the links may be shaped so that the ramp body may be placed in a substantially folded or spiral shape when in said retracted position.

Desirably the endless drive band is arranged so that the assembly is substantially under the vehicle or within allowable space clearance from the vehicle.

Advantageously the drive arrangement incudes a delivery guide to guide the ramp body in an upwardly inclined direction when initially moving out of the housing for extending to the extended position. This ensures that the assembly can be used for a large range of heights and/or distance between the floor and the ground of platform.

The drive arrangement is arranged so that the trailing end of the ramp body is supported on the upper control sprocket/pulley when the ramp body reaches the extended position.

The links at each side of said trailing end is connected to the endless drive by a tee connector having a shaft which extends into a stabiliser rod positioned between the links at said trailing end.

The ramp assembly may include interrupt means for interrupting operation thereof when an obstacle is in the path between the retracted position and the extended position. Sensor means employed for this purpose can be infra red sensors, switch means on any part of the ramp body or load sensing means.

In order to manually retract the ramp body during power failure, means may be provided to uncouple the ramp body from the drive arrangement.

Travel limiting means may also be arranged so that the drive arrangement automatically stops at the retracted position and at the extended position.

The travailing speed of the ramp body is preferably variable so that the authority can select a suitable speed.

BRIEF DESCRIPTION OF THE DRAWINGS

In order that the present invention be more readily understood and be put into practical effect, reference will now be made to the accompanying drawings wherein:

FIG. 4 is a plan view of the connection between the ramp body and the drive chain.

DETAILED DESCRIPTION OF THE DRAWINGS

Figure 1A:
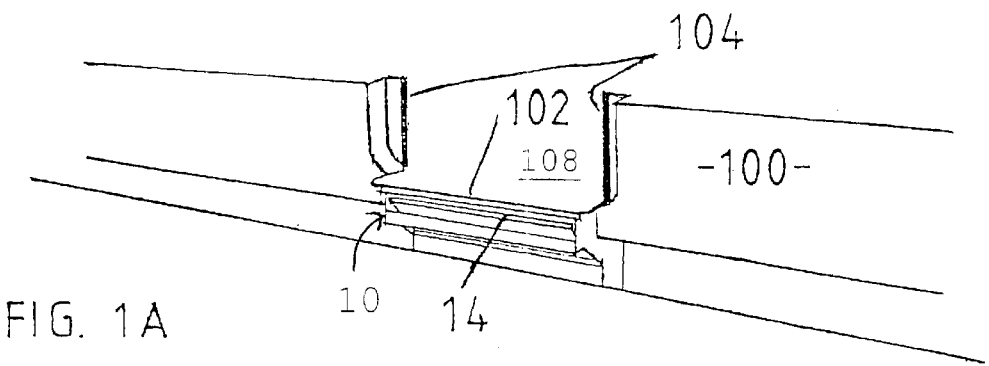
FIGS. 1A to 1D show four stages of the ramp assembly of the present invention.

Referring now to the drawings and initially to FIGS. 1A to 1D, there is shown a ramp assembly 10 for a car of a rail train 100. The ramp assembly is positioned just beneath a step 102 and floor level 108 at a door opening 104 of the car 100.

The ramp assembly 10 has a ramp body 12. As can be seen in FIG. 1A when the ramp body 12 is in its fully retracted position only the leading end 14 of the ramp body 12 is visible externally.

Figure 1B:
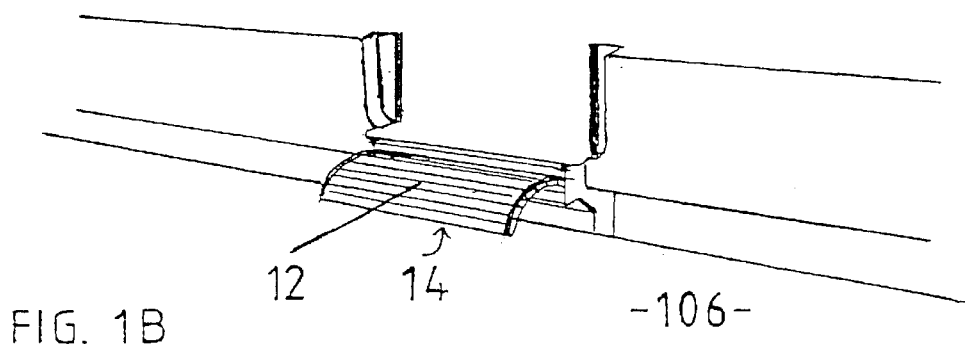

FIG. 1B shows the ramp body 12 at about one-quarter extended position. The ramp body 12 as shown is not yet in contact with a platform 106 and it assumes a curved shape (to be explained later in reference to FIG. 3).

Figure 1C:
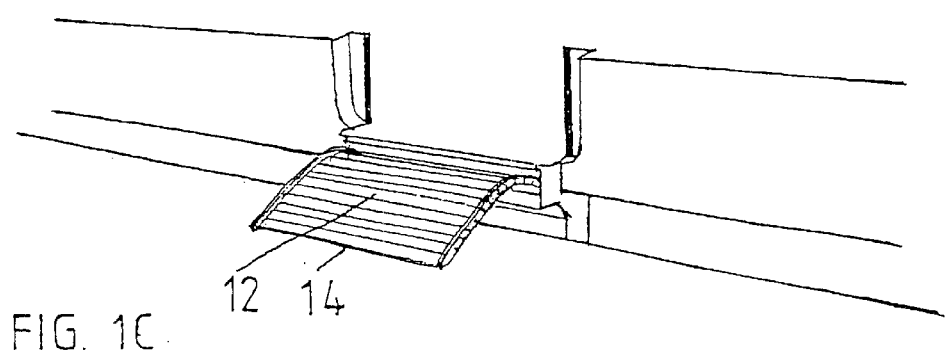

FIG. 1C shows the ramp body 12 at about half extended position. In this position the leading end 14 is in contact with the platform 106 and the curvature of the body 12 is now substantially less than that shown in FIG. 1B. The body 12 continues to be driven to slide along the platform 106 until it is in the fully extended position as shown in FIG. 1D.

When the fully extended position is detected, a reversible electric motor (not shown) for moving the body 12 stops operation until its control switch (not shown) is put in the position to reverse the movement of the motor for retracting the body 12 to the retracted position. The motor stops again when it senses that the retracted position is reached.

Figure 1D:
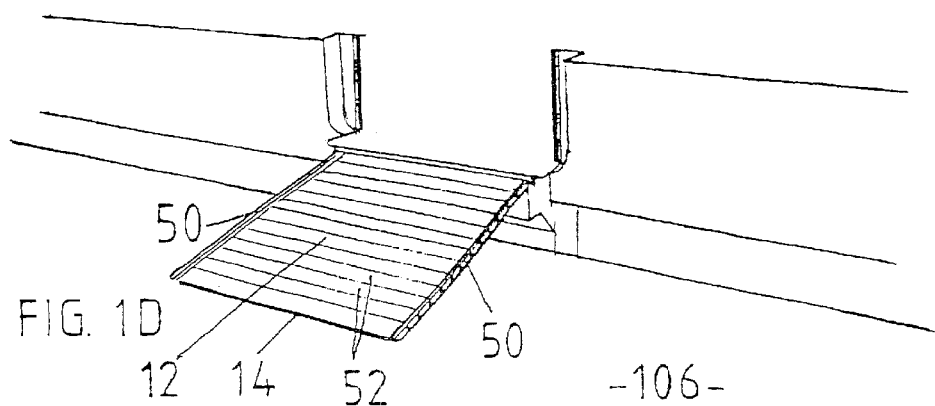

As can be seen in FIG. 1D, the ramp body 12 is substantially flat in the position shown.

Figure 2:
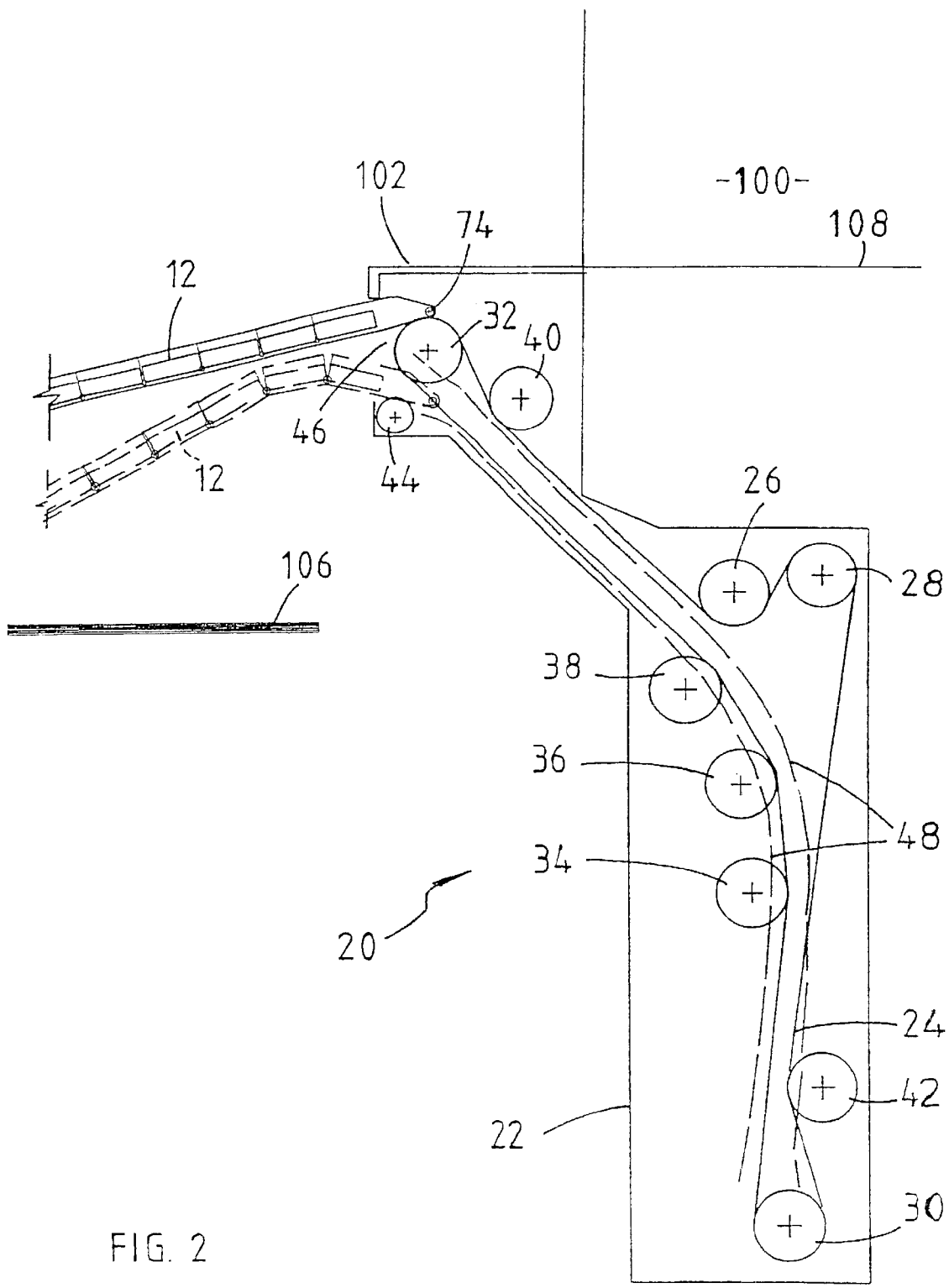
FIG. 2 is skeleton side view of the ramp assembly shown in FIGS. 1A to 1D.

The ramp body 12 is moved by a drive arrangement 20 shown in detail in FIG. 2. The drive arrangement 20 has a housing member 22 in which various sprockets and a drive chain 24 are located. As can be seen the housing member 22 and the chain 24 are configured to be under the floor 108 of the car 100 and within the lateral extend of the step 102. In this embodiment of the invention the housing member 22 extends substantially perpendicular to the floor level 108. If required the housing member 22 can be positioned to extend in an inclined direction or parallel with the floor level 108.

The drive arrangement 20 includes a drive sprocket 26 which is coupled to the motor (not shown). The chain 24 loops around the lower part of the sprocket 26 and then over a guide sprocket 28. The chain 24 continues downwardly from the sprocket 28 to a bottom control sprocket 30 and then upwardly to a top support sprocket 32 before returning to the sprocket 26.

Between sprockets 30 and 32, three control sprockets 34, 36 and 38 are provided for the purpose of allowing the ramp body 12 to follow a curved trajectory path.

A pinch sprocket 40 is provided between sprockets 26 and 32 for ensuring that the chain 24 does not contact with the car 100.

In order to allow adjustable tensioning of the chain 24, a tensioning sprocket 42 is provided. The sprocket 42 can be moved for adjusting the tension on the chain 24.

A delivery roller 44 is located at the mouth 46 of the housing member 22. The roller 44 is provided for guiding the ramp body 12 upwardly when it leaves the mouth 46.

In the housing member 22 guides 48 are provided for guiding the ramp body 12 into and out of the retracted position.

The ramp body 12 initially moves upwardly as it leaves the mouth 46 and starts to bend downwardly a short distance from the mouth 46. This gives the ramp body 12 the flexibility required for use with platforms 106 of varying heights and/or distance from the step 102.

FIG. 2 shows the curve shape of the ramp body 12 when it is in initial contact with the platform 106, and the body 12 changes to a substantially flat shape when it is in the fully extended position.

In order to provide a sturdy support for the ramp body 12 in the fully extended position, the drive arrangement 20 positions the body 12 over the support sprocket 32 so that the trailing end of the body 12 is supported by the sprocket 32.

It should be noted that whilst FIG. 2 shows a single drive arrangement 20, the assembly 10 has two such arrangements, one on each side of the assembly 10.

The ramp body 12 has spaced beams 50 and a number of slats 52 fixed to the beams 50. Each of the beams 50 as shown partly in FIG. 3 has a plurality of articulated links 54 and the slats 52 are fixed to corresponding links 54 of the beams.

Figure 3:
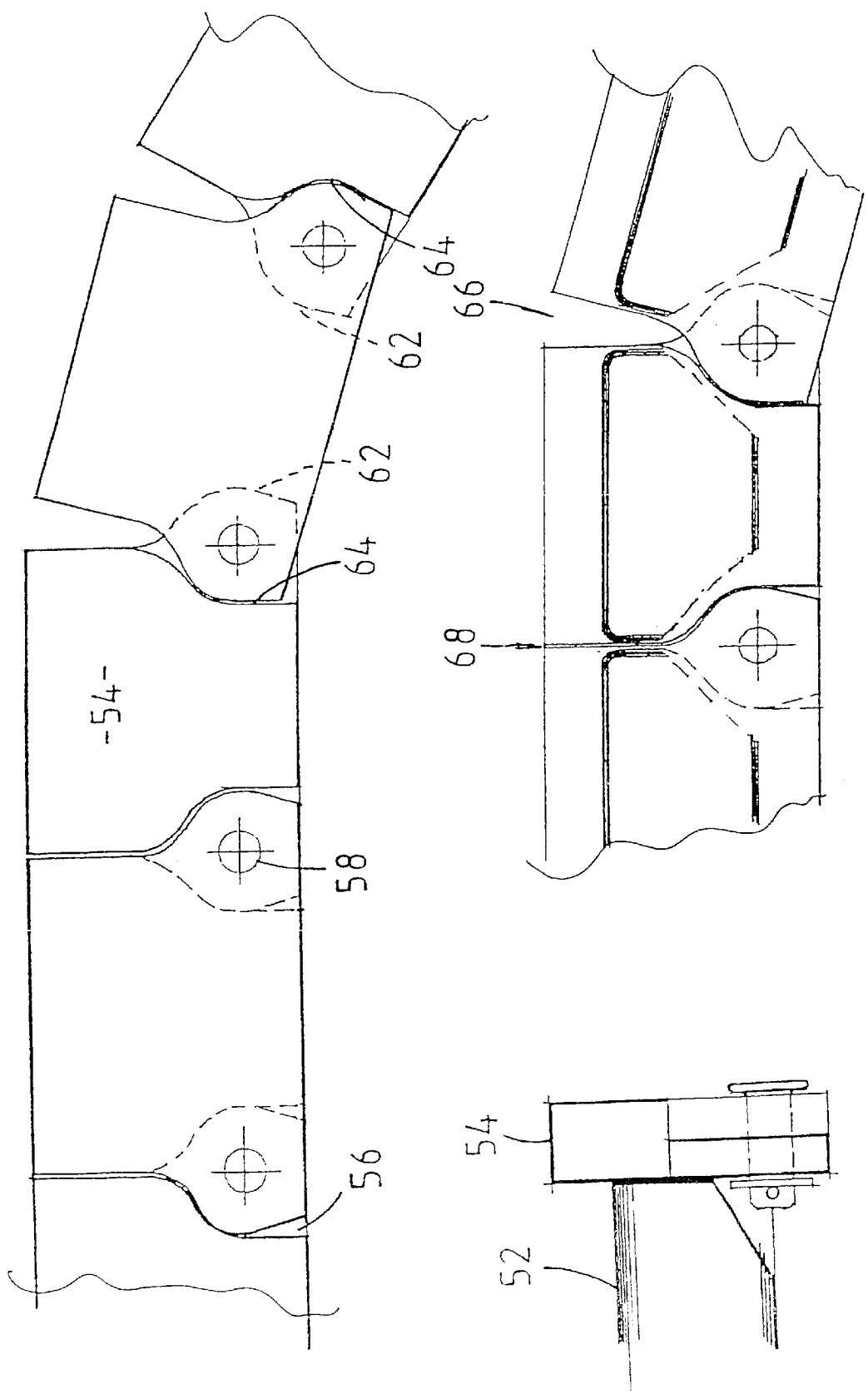
FIG. 3 shows elevation section views of the links for the assembly of FIG. 2.

In FIG. 3 the top drawing shows a side view of the ramp body 12, the bottom right a section view into a beam 50 from inside the body 12, and the bottom left drawing a section view through a link 54.

As can be seen each link 54 has a larger lower half then its upper half. The lower half has recessed pivot parts 56 on either sides thereof. A through hole 58 in each of the parts 56 is provided for receiving a pivot pin 60 made of hardened steel.

Each of the recessed parts 56 has a curved outer edge 62 and a cooperating curved inner edge 64.

The edges 62 and 64 are so shaped that when adjacent links 54 are pivotally joined together by the pin 60 the adjacent links 54 can articulate or rotate relative to each other to limit of articulation angle 66 determined by the shape of the lower edges of the recessed parts 56.

The edges at the top halves of the adjacent links 54 determine the camber angle 68 in the beams 50.

By suitable design the width of the top half and the recessed pivot parts 56 the ramp body 12 can be adjusted for different camber and different angle of articulation.

As shown in FIG. 4 the trailing end link 70 is not fixed to a slat 52 but to a stabiliser rod 72. The link 70 is connected to the chain 24 by a tee connector 74 which extends through the pivot hole 58 on the link 70 and into the stabiliser rod 72.

Whilst the above has been given by way of illustrative example of the present invention many variations and modifications thereto will be apparent to those skilled in the art without departing from the broad ambit and scope of the invention as herein set forth.

What is claimed is:

1. A ramp assembly for accessing a vehicle having a door opening and a floor, the assembly comprising:
    a housing member for fixing to the vehicle at or beneath the floor and substantially in line with the door opening, an extendible ramp body controllably positionable between an extended position and a retracted position; and
    a drive arrangement for controllably driving the ramp body between the extended position and the retracted position, in the extended position the ramp body extends inclinedly from or adjacent to the floor to the ground or platform and in the retracted position the ramp body is positioned within the housing member,
    the ramp body having articulated means for moving and curling the ramp body in a pre-determined curved trajectory path when the ramp body is moved between the retracted position and the extended position.

2. The assembly according to claim 1 wherein the housing member extends substantially parallel with, inclined to or perpendicular to the floor.

3. The assembly according to claim 1 wherein the assembly includes a controllable reversible or reciprocable drive means for reversibly or reciprocally driving the ramp body between the retractable position and the extended position, a plurality of guide means for guiding the ramp body to move along the trajectory path and an endless drive connected to the ramp body for moving therewith.

4. The assembly according to claim 3 wherein the drive means has a support arrangement for supporting the ramp body at said extended position.

5. The assembly according to claim 4, wherein the endless drive is a chain or belt, and the drive means includes a drive sprocket or pulley coupled to the drive shaft of a reversible motor drive or a linear to rotary converter driven by a pneumatic or hydraulic ram, a lower control sprocket or pulley, an upper control sprocket or pulley arranged for supporting the ramp body at the extended position, a plurality of guide sprockets pulley for guiding the chain or belt and a plurality of trajectory control sprockets or pulley for controlling the chain or belt to move the ramp body in the trajectory path.

6. The assembly according to claim 5 wherein a tensioning sprocket or pulley is provided for adjusting the tension on the chain or belt.

7. The assembly according to claim 5 wherein the ramp body has a leading end and a trailing end which is remote from the leading end, and the drive arrangement is arranged so that the trailing end of the ramp body is supported on the upper control sprocket or pulley when the ramp body reaches the extended position.

8. The assembly according to claim 7 wherein the links at each side of said trailing end is connected to the endless drive by a tee connector having a shaft which extends into a stabiliser rod positioned between the links at said trailing end.

9. The assembly according to claim 1 wherein the drive arrangement includes a delivery guide to guide the ramp body to move initially in an upwardly direction when moving out of the housing member for extending to the extended position.

10. The assembly according to claim 1 wherein the ramp assembly includes sensor means arranged on a part of the ramp body or load sensing means and interrupt means for interrupting operation thereof when an obstacle is in the path between the retracted position and the extended position or when the load sensor means sensing an overload condition.

11. The assembly according to claim 1 wherein the assembly includes uncoupling means for uncoupling the ramp body from the drive arrangement so that the ramp body can be manually retracted.

12. The assembly according to claim 1 wherein the assembly includes travel limiting means arranged so that the drive arrangement automatically stops at the retracted position and at the extended position.

13. The assembly according to claim 1 wherein the assembly includes speed adjustment means for selectively adjusting the travelling speed of the ramp body.

14. A ramp assembly for accessing a vehicle having a door opening and a floor, the assembly comprising a housing member for fixing to the vehicle at or beneath the floor and substantially in line with the door opening, an extendible ramp body controllably positionable between an extended position and a retracted position, and a drive arrangement for controllably driving the ramp body between the extended position and the retracted position, in the extended position the ramp body extends inclinedly from or adjacent to the floor to the ground or platform and in the retracted position the ramp body is positioned within the housing member, the ramp body having articulated means adapted for moving the ramp body in a pre-determined curved trajectory path between the retracted position and the extended position
    wherein the articulated means includes a pair of spaced beams arranged in the direction of travel of the body and a plurality of slats arranged between the beams.

15. The assembly according to claim 16 wherein each of the beams has a plurality of links that are pivotally joined together for providing said articulation in the ramp body.

16. The assembly according to claim 15 wherein opposing faces of the adjacent links have mating linkage parts which are pivotally joined together for providing articulation to said ramp body.

17. The assembly according to claim 16 wherein the linkage parts are recessed so that all links are in the same plane and each of the linkage parts having an outer substantially curve-shaped edge surface and an inner substantially curve-shaped edge surface for matingly co-operating with the outer-surface of an adjacent link.

18. The assembly according to claim 17 wherein the mating linkage parts have co-operating articulation limiting means for limiting the angle of articulation.

19. The assembly according to claim 18 wherein the articulation limiting means includes shaped articulation limiting edge surfaces on the mating linkage parts so that the mating linkage parts are in abuttal relationship when said adjacent links are at a maximum angle of articulation.

20. The assembly according to claim 19 wherein the positions of the opposing edges remote from the articulation limiting means are shaped to provide cooperating camber angle limiting parts.

21. The assembly according to claim 20 wherein the camber angle limiting parts are straight surfaces on said portions of the opposing edges and the distance between the surfaces of each link is selectively determined for the camber angle.

22. The assembly according to claim 15 wherein the links are shaped so that adjacent links can move relative to each other within an angle of articulation and a camber in the beams determined by the shape of the links.

23. The assembly according to claim 15 wherein the links are shaped so that the ramp body can be placed in a substantially folded or spiral shape when in said retracted position.

24. A ramp assembly for traversing a gap, comprising:

an articulated ramp carried by a housing, said ramp being movable between a retracted position in which said ramp is within said housing and an extended position in which said ramp is extended from said housing, said ramp having a pair of spaced apart articulated beams that extend in a direction of movement of said ramp, each of said pair of beams having a plurality of links, said beams being substantially linear when said ramp is in the extended position and being curved during movement between the retracted and extended positions, and said ramp further having a gap traversing surface with plural slats that are transverse to said pair of beams and that are each attached to a respective pair of said links.

* * * * *